(12) United States Patent
Halumi et al.

(10) Patent No.: US 10,621,084 B2
(45) Date of Patent: Apr. 14, 2020

(54) EFFICIENT GARBAGE COLLECTION IN THE PRESENCE OF BLOCK DEPENDENCIES

(71) Applicant: International Business Machines Corporation, Armonk, NY (US)

(72) Inventors: Afief Halumi, Tel Aviv (IL); Yosef Shatsky, Karnei Shomron (IL); Asaf Porat-Stoler, Tel Aviv (IL); Reut Cohen, Givat Shmuel (IL); Sergey Marenkov, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/912,398

(22) Filed: Mar. 5, 2018

(65) Prior Publication Data
US 2019/0272229 A1  Sep. 5, 2019

(51) Int. Cl.
*G06F 12/02* (2006.01)

(52) U.S. Cl.
CPC ...... *G06F 12/0253* (2013.01); *G06F 12/0238* (2013.01)

(58) Field of Classification Search
CPC ...... G06F 3/0644; G06F 3/0608; G06F 3/064; G06F 12/0253; G06F 12/0238
See application file for complete search history.

(56) References Cited

U.S. PATENT DOCUMENTS

| | | | |
|---|---|---|---|
| 5,604,902 A * | 2/1997 | Burkes | G06F 3/0601 |
| 6,065,020 A * | 5/2000 | Dussud | G06F 12/0253 |
| 8,185,778 B2 | 5/2012 | Kilzer et al. | |
| 8,205,203 B2 * | 6/2012 | Auerbach | G06F 12/0269 |
| | | | 718/102 |
| 8,713,268 B2 * | 4/2014 | Dillow | G06F 11/108 |
| | | | 711/114 |
| 8,788,778 B1 * | 7/2014 | Boyle | G06F 12/0253 |
| | | | 711/155 |

(Continued)

OTHER PUBLICATIONS

Che-Wei Tsao, Yuan-Hao Chang, Ming-Chang Yang, Performance Enhancement of Garbage Collection for Flash Storage Devices: An Efficient Victim Block Selection Design, 2013. IEEE (Year: 2013).*

(Continued)

*Primary Examiner* — Khoa D Doan
(74) *Attorney, Agent, or Firm* — Griffiths & Seaton PLLC (57) ABSTRACT

Embodiments for efficient garbage collection in a data storage environment. In a storage system comprising multiple storage devices having respective sets of storage regions, at least one respective storage fragmentation threshold used to trigger a garbage collection operation is identified. The garbage collection operation is performed to reclaim data space in the storage system according to each of a block perspective and an area perspective. The block perspective performs the garbage collection operation on individual blocks of data and the area perspective performs the garbage collection operation on a plurality of the blocks in a respective storage region. The block perspective and the area perspective portions of the garbage collection operation are executed independently of one another.

18 Claims, 7 Drawing Sheets

700

702 — IDENTIFY, IN A STORAGE SYSTEM COMPRISING MULTIPLE STORAGE DEVICES HAVING RESPECTIVE SETS OF STORAGE REGIONS, AT LEAST ONE RESPECTIVE STORAGE FRAGMENTATION THRESHOLD USED TO TRIGGER A GARBAGE COLLECTION OPERATION.

704 — PERFORM THE GARBAGE COLLECTION OPERATION TO RECLAIM DATA SPACE IN THE STORAGE SYSTEM ACCORDING TO EACH OF A BLOCK PERSPECTIVE AND AN AREA PERSPECTIVE, THE BLOCK PERSPECTIVE PERFORMING THE GARBAGE COLLECTION OPERATION ON INDIVIDUAL BLOCKS OF DATA AND THE AREA PERSPECTIVE PERFORMING THE GARBAGE COLLECTION ON A PLURALITY OF THE BLOCKS IN A RESPECTIVE STORAGE REGION SUCH THAT THE BLOCK PERSPECTIVE AND THE AREA PERSPECTIVE ARE EXECUTED INDEPENDENTLY OF ONE ANOTHER.

(56) References Cited

U.S. PATENT DOCUMENTS

| | | | | |
|---|---|---|---|---|
| 8,819,375 | B1* | 8/2014 | Pruett | G06F 13/28 |
| | | | | 707/693 |
| 9,158,670 | B1* | 10/2015 | Kang | G06F 12/0246 |
| 9,176,817 | B2 | 11/2015 | Cideciyan et al. | |
| 9,189,392 | B1* | 11/2015 | Neppalli | G06F 3/064 |
| 9,588,904 | B1 | 3/2017 | Lercari et al. | |
| 9,703,795 | B2 | 7/2017 | Amit et al. | |
| 9,817,717 | B2 | 11/2017 | Lee | |
| 10,241,716 | B2* | 3/2019 | Mainali | G06F 3/0604 |
| 10,248,562 | B2* | 4/2019 | Mainali | G06F 12/0253 |
| 2007/0174579 | A1* | 7/2007 | Shin | G06F 12/0246 |
| | | | | 711/170 |
| 2011/0055455 | A1* | 3/2011 | Post | G06F 12/0246 |
| | | | | 711/103 |
| 2011/0225347 | A1* | 9/2011 | Goss | G06F 12/0246 |
| | | | | 711/103 |
| 2012/0278564 | A1* | 11/2012 | Goss | G06F 12/0253 |
| | | | | 711/155 |
| 2013/0282955 | A1* | 10/2013 | Parker | G06F 12/0246 |
| | | | | 711/103 |
| 2014/0032817 | A1* | 1/2014 | Bux | G06F 12/0246 |
| | | | | 711/103 |
| 2014/0082317 | A1* | 3/2014 | Brooker | G06F 3/0605 |
| | | | | 711/171 |
| 2014/0173017 | A1* | 6/2014 | Takagi | H04L 67/06 |
| | | | | 709/213 |
| 2014/0189206 | A1* | 7/2014 | Sinclair | G06F 12/0246 |
| | | | | 711/103 |
| 2015/0338910 | A1* | 11/2015 | Allen-Ware | G06F 1/3225 |
| | | | | 713/320 |
| 2015/0347025 | A1* | 12/2015 | Law | G06F 3/0611 |
| | | | | 711/103 |
| 2016/0019160 | A1* | 1/2016 | Mohan | G06F 12/1009 |
| | | | | 711/208 |
| 2016/0147652 | A1 | 5/2016 | Miyaji et al. | |
| 2016/0231945 | A1* | 8/2016 | Choudhuri | G06F 3/0608 |
| 2016/0232088 | A1* | 8/2016 | Mohan | G06F 12/0246 |
| 2016/0283160 | A1* | 9/2016 | Trika | G06F 3/0638 |
| 2016/0313943 | A1* | 10/2016 | Hashimoto | G06F 16/00 |
| 2017/0031597 | A1* | 2/2017 | Bulkowski | G06F 3/0604 |
| 2017/0068456 | A1* | 3/2017 | Toge | G06F 3/0605 |
| 2017/0255550 | A1* | 9/2017 | Kim | G06F 12/0253 |
| 2019/0007206 | A1* | 1/2019 | Surla | H04L 9/0891 |

OTHER PUBLICATIONS

Fridtjof Siebert, The impact of realtime garbage collection on realtime Java programming. IEEE 2004 (Year: 2004).*

Cai et al., "Errors in Flash-Memory-Based Solid-State Drives: Analysis, Mitigation, and Recovery," arXiv:1711.11427v2 [cs.AR], Jan. 5, 2018 (86 pages).

Meng et al., "An Efficient NAND Flash Garbage Collection Algorithm Based on Area and Block Operation," 2012 International Conference on Intelligent Systems Design and Engineering Application, 2012 (4 pages).

* cited by examiner

EFFICIENT GARBAGE COLLECTION IN THE PRESENCE OF BLOCK DEPENDENCIES

BACKGROUND OF THE INVENTION

Field of the Invention

The present invention relates in general computing systems, and more particularly to, various embodiments for optimizing storage system resources through efficient reclamation of data within and/or between distributed computing components.

Description of the Related Art

In computer systems, garbage collection is a technique that produces the systematic recovery of pooled computer storage. By performing garbage collection on an as-needed basis, the computer system can free the storage for use by other programs (or processes within a given program). Additionally, by ensuring that a program using increasing amounts of pooled storage does not reach its quota, garbage collection can help ensure that programs executing on computer systems have the necessary memory resources to execute efficiently.

SUMMARY OF THE INVENTION

Various embodiments are disclosed herein for efficient garbage collection in a data storage environment. In a storage system comprising multiple storage devices having respective sets of storage regions, at least one respective storage fragmentation threshold used to trigger a garbage collection operation is identified. The garbage collection operation is performed to reclaim data space in the storage system according to each of a block perspective and an area perspective. The block perspective performs the garbage collection operation on individual blocks of data and the area perspective performs the garbage collection operation on a plurality of the blocks in a respective storage region. The block perspective and the area perspective portions of the garbage collection operation are executed independently of one another.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, garbage collection is a technique that produces the systematic recovery of pooled computer storage. By performing garbage collection on an as-needed basis, the computer system can free the storage for use by other programs (or processes within a given program). Additionally, by ensuring that a program using increasing amounts of pooled storage does not reach its quota, garbage collection can help ensure that programs executing on computer systems have the necessary memory resources to execute efficiently.

The mechanisms of the illustrated embodiments provide an efficient mechanism for performing these types of garbage collection operations by introducing a dual-perspective approach. Namely, the garbage collection operation is triggered according to an area or region perspective which handles high, localized fragmentation of many blocks, and a block perspective which handles moderate, distributed fragmentation of individual blocks. In this way, resources of a storage system performing the garbage collection operation are only used necessarily depending on the type of fragmentation and perspective (i.e., scope) of the garbage collection operation, as will be further described.

Figure 1:
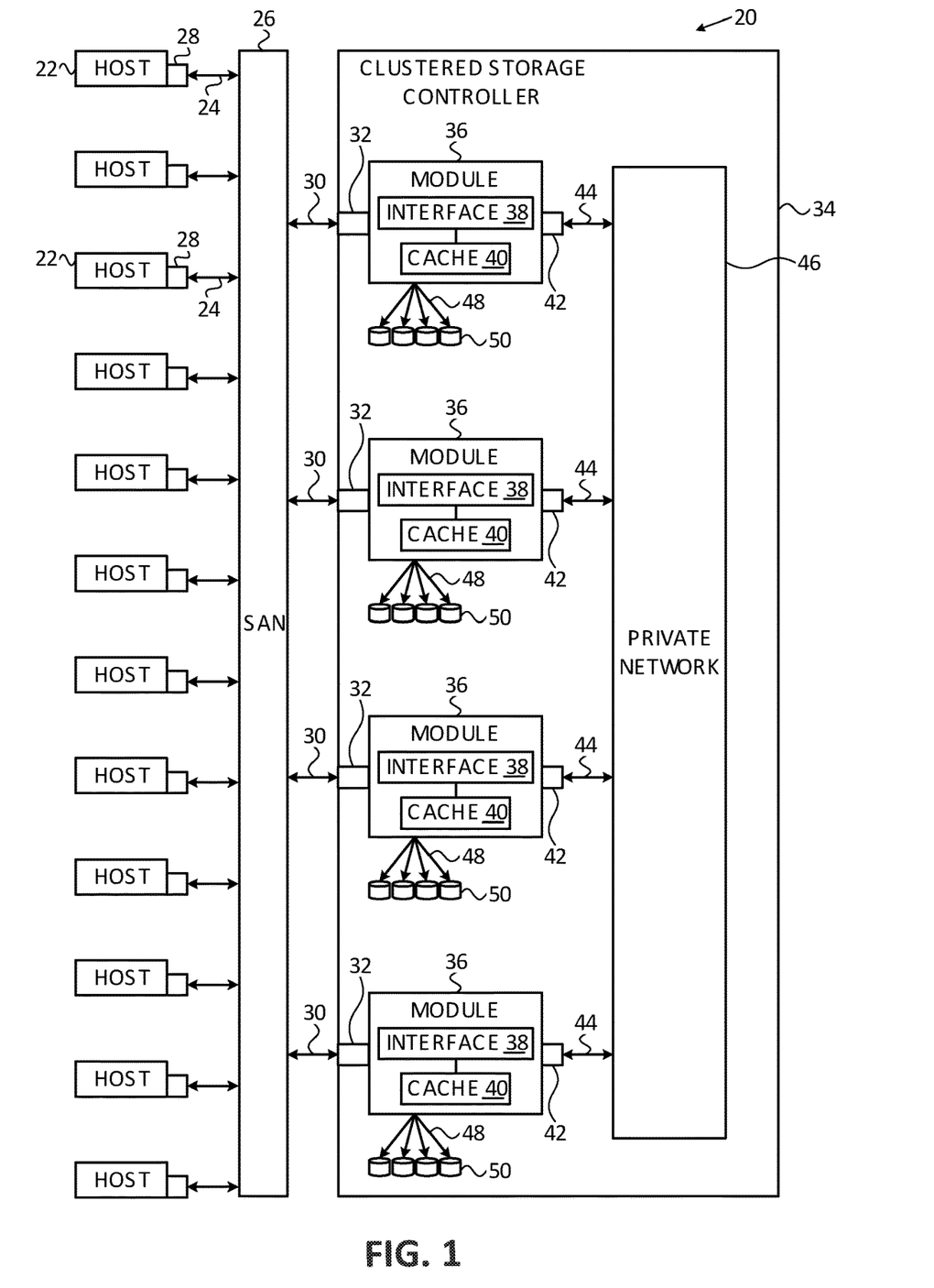
FIG. 1 illustrates a block diagram of a computer storage environment in which aspects of the present invention may be realized.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
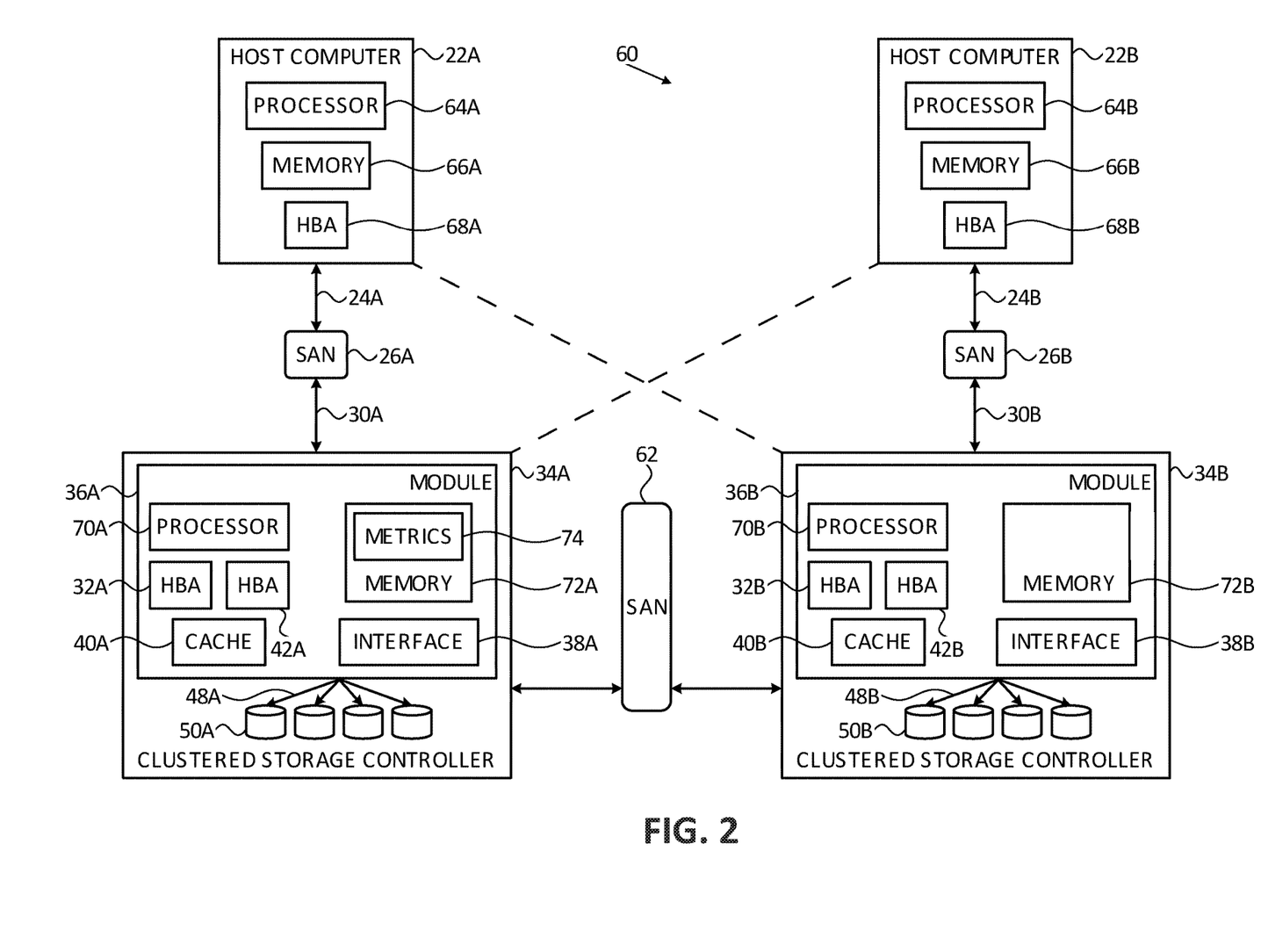
FIG. 2 illustrates a block diagram of a hardware structure of a data storage system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 100 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62. In other embodiments, as will be described herein, the first host computer 22A may be directly connected to the clustered storage controller 34B, and the second host computer 22B may be directly connected to the clustered storage controller 34A via a SAN similar to SAN 62, a virtualized networking connection, or any other computer implemented medium.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70B and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (i SCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

It is further understood in advance that although this disclosure includes a detailed description on cloud computing, following, that implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes and storage systems (e.g. storage subsystem 20).

Figure 3:
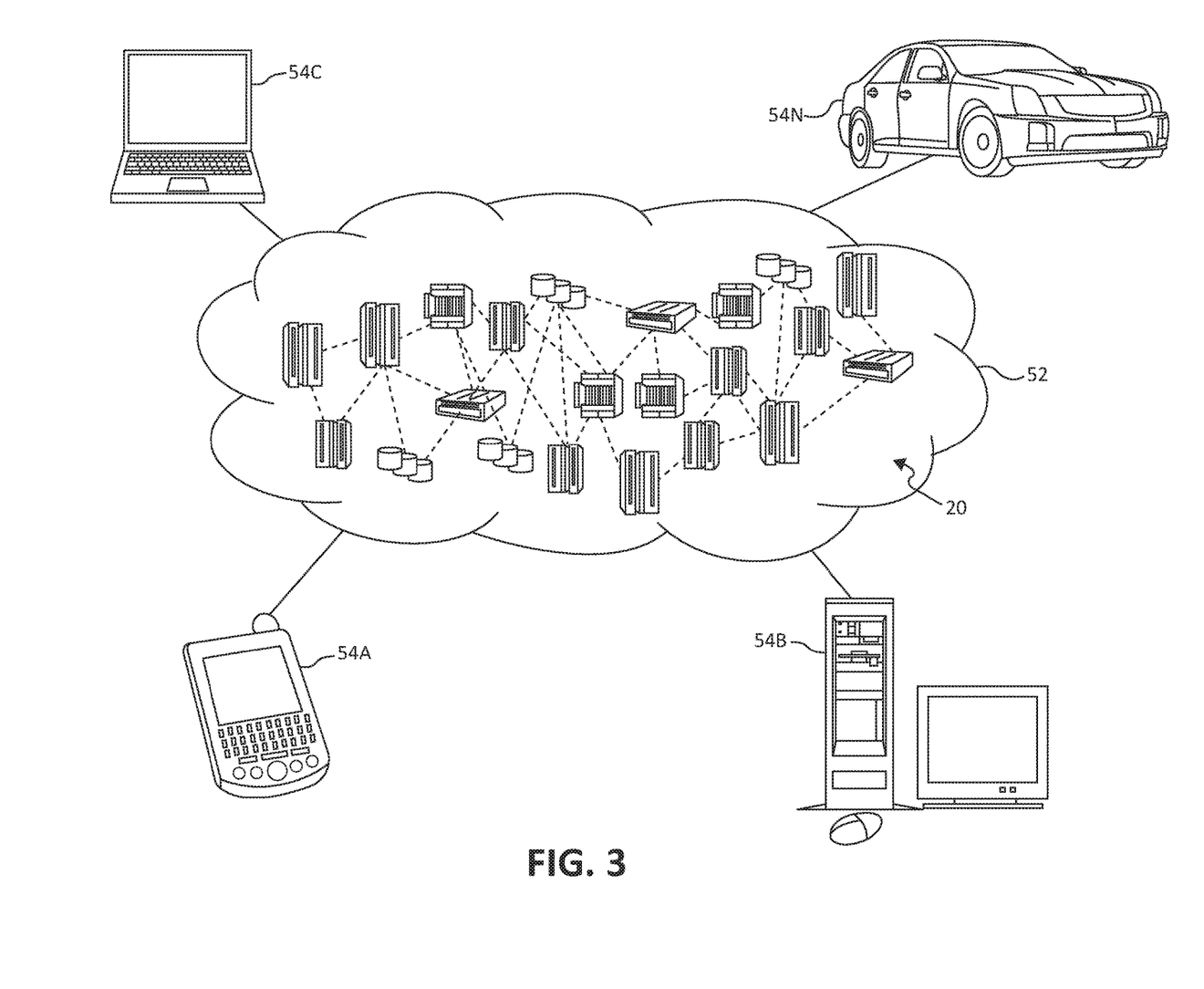
FIG. 3 illustrates a block diagram of an exemplary cloud computing environment according to embodiments of the present invention.

Referring now to FIG. 3, illustrative cloud computing environment 52 is depicted. As shown, cloud computing environment 52 comprises one or more storage subsystems 20 and cloud computing nodes with which local computing devices used by cloud consumers, such as, for example, personal digital assistant (PDA) or cellular telephone 54A, desktop computer 54B, laptop computer 54C, and/or automobile computer system 54N may communicate. Storage systems 20 and the cloud nodes may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 3 are intended to be illustrative only and that storage subsystems 20, cloud computing nodes and cloud computing environment 52 can communicate with any type of computerized device over any type of network and/or network addressable connection (e.g., using a web browser).

Figure 4:
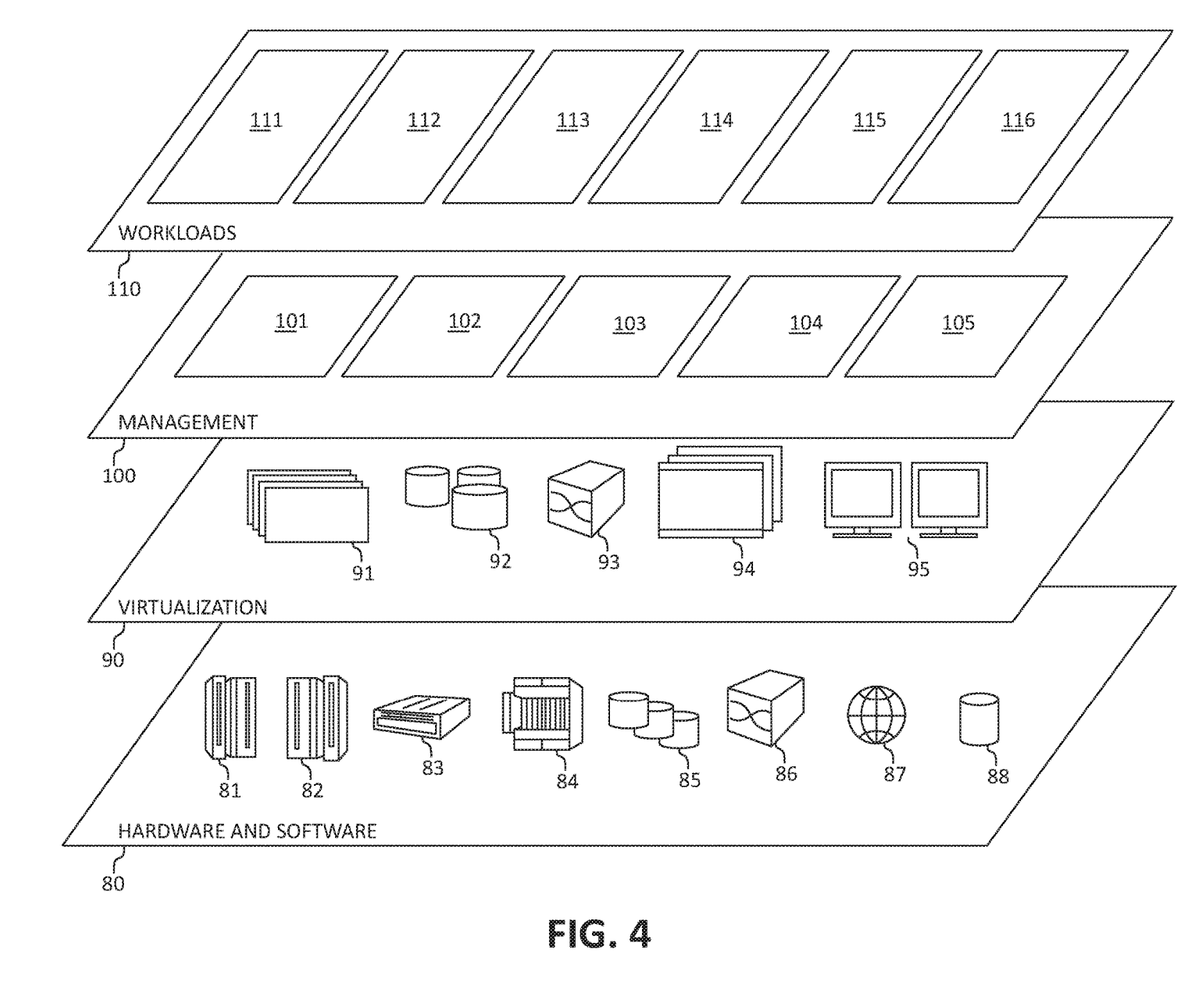
FIG. 4 illustrates a block diagram depicting abstraction model layers according to embodiments of the present invention.

Referring now to FIG. 4, a set of functional abstraction layers provided by cloud computing environment 52 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 80 includes hardware and software components. Examples of hardware components include: mainframes 81; RISC (Reduced Instruction Set Computer) architecture based servers 82; servers 83; blade servers 84; storage devices 85; and networks and networking components 86. In some embodiments, software components include network application server software 87 and database software 88.

Virtualization layer 90 provides an abstraction layer from which the following examples of virtual entities may be provided: virtual servers 91; virtual storage 92; virtual networks 93, including virtual private networks; virtual applications and operating systems 94; and virtual clients 95.

In one example, management layer 100 may provide the functions described below. Resource provisioning 101 provides dynamic procurement of computing resources and other resources that are utilized to perform tasks within the cloud computing environment. Metering and Pricing 102 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 103 provides access to the cloud computing environment for consumers and system administrators. Service level management 104 provides cloud computing resource allocation and management such that required service levels are met. Service Level Agreement (SLA) planning and fulfillment 105 provides pre-arrangement for, and procurement of, cloud computing resources for which a future requirement is anticipated in accordance with an SLA.

Workloads layer 110 provides examples of functionality for which the cloud computing environment may be utilized. Examples of workloads and functions which may be provided from this layer include: mapping and navigation 111; software development and lifecycle management 112; virtual classroom education delivery 113; data analytics processing 114; transaction processing 115; and, in the context of the illustrated embodiments of the present invention, various data reclamation functions 116. One of ordinary skill in the art will appreciate that the data reclamation functions 116 may also work in conjunction with other portions of the various abstractions layers, such as those in hardware and software 80, virtualization 90, management 100, and other workloads 110 (such as data analytics processing 114, for example) to accomplish the various purposes of the illustrated embodiments of the present invention.

Efficient Garbage Collection in the Presence of Block Dependencies

Figure 5A:
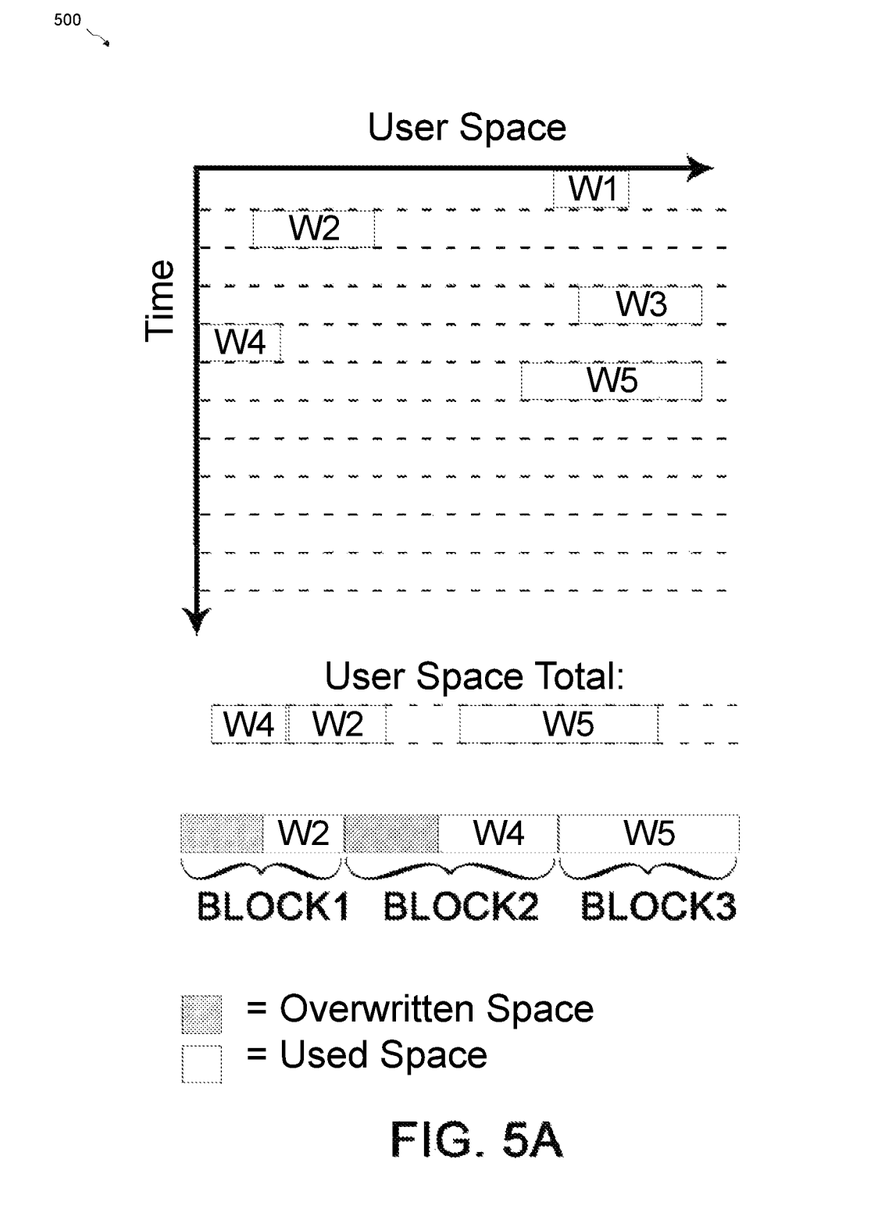
FIG. 5A illustrates a block diagram of user data prior to performing a garbage collection operation, in accordance with aspects of the present invention.

In storage systems (such as storage subsystem 20), the physical space is often divided into fixed-size blocks. Each block represents an allocation unit and is likely to contain several user writes from different and non-adjacent virtual offsets, where the allocation scheme cannot necessarily use the invalidated space created from such writes. One issue encountered in such a system is that, as data is partially overwritten, the blocks contain less and less relevant data for the user, as illustrated in diagram 500 of FIG. 5A. Diagram 500 depicts user writes (referenced W1-W5) written at virtual offsets over a period of time. Again, as the data is partially overwritten (i.e., of user writes W1 and W3), the allocation scheme cannot necessarily use the invalidated physical space, which ultimately creates holes or fragments within the given storage blocks (i.e., blocks 1-3 where blocks 1 and 2 have holes, as referenced in diagram 500).

Figure 5B:
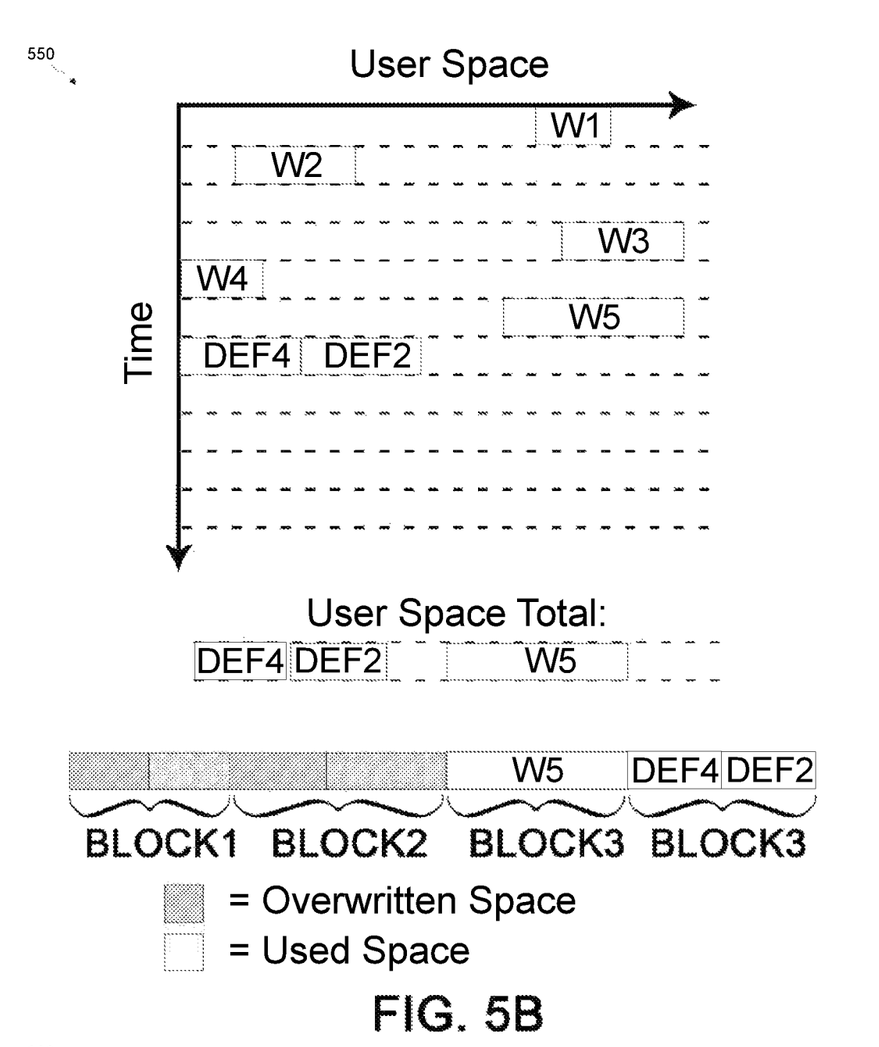
FIG. 5B illustrates a block diagram of user data subsequent to performing the garbage collection operation, in accordance with aspects of the present invention.

To solve this problem and mitigate waste of the invalidated space, a garbage collection process or operation referenced previously is performed to reclaim the unused space. Such a process reads blocks that are no longer fully utilized and rewrites these blocks in a compact format so as to reclaim the space of the original blocks, as illustrated in diagram 550 of FIG. 5B. Diagram 550 depicts the compaction of user writes W4 and W2 (referenced as Def4 and Def2, respectively) into block 4, the compaction of user write W5 into block 3, and the consequent reclamation thereof of the space of blocks 1 and 2.

Unfortunately, the described process of performing such garbage collection requires system resources that could otherwise have been allocated to performing user Input/Output (I/O) operations. For example, the consumed system resources may include (a) processing hardware (e.g., CPU(s)) for I/O operations to read the partially-empty blocks and rewrite their data in compact form; (b) in a storage environment employing data reduction techniques, processor(s) or other dedicated hardware to decompress and compress the data; and (c) CPU processing to process the underlying data.

Further complicating matters when reclaiming space by virtue of the performance of the garbage collection technique are interdependent blocks (e.g., where a portion of interdependent data is distributed over more than one data block). When performing a garbage collection operation on an interdependent block of data, the garbage collection process of one block will remove data from its interdependent block(s), then requiring these blocks to be processed by the garbage collection operation as well. This dependency makes the decision of whether to defragment a certain block more nuanced, as when a first block undergoes defragmentation, this defragmentation operation may cause interdependent (connected) blocks of the first block to become fragmented (and thus requiring another garbage collection operation to be performed on the interdependent block). If this defragmentation process is not managed well it can cause a repeated cascade of each garbage collection cycle where an equal number of fragmented blocks occur for each defragmented block, leading to a lengthy and repetitive garbage collection cycle. This makes the scope and cost of garbage collecting a block to be unknown, and thus the decision of whether or not to perform garbage collection on this block to be very non-trivial.

Accordingly and as previously described, the mechanisms of the illustrated embodiments provide an efficient mechanism for performing these types of garbage collection operations by introducing a dual-perspective approach. That is, the garbage collection operation is triggered according to an area or region perspective which handles high, localized fragmentation of many blocks, and a block perspective which handles moderate, distributed fragmentation of individual blocks. In this way, the storage system achieves a high utilization of physical space while resources of the storage system performing the garbage collection operation are only used necessarily depending on the type of fragmentation and perspective (i.e., scope) of the garbage collection operation. Further, this functionality aids in resolving the issue of defragmenting interdependent blocks such that a most efficient decision is made as to whether to perform the garbage collection operation on certain blocks or areas of blocks without the consequence of creating additional fragmented blocks. This is because, assuming that blocks are interdependent only within a given area or region, when performing the garbage collection operation according to the area perspective where multiple blocks within a given area are processed, dependent block(s) of a first block are inherently processed for garbage collection in addition to the first block when either block(s) are within the given region.

It should be noted that the language of "perspective" of the instant disclosure is used merely for brevity and to facilitate a clearer, comprehensive view of the garbage collection process. When discussing perspectives herein, the "area perspective" and "block perspective" are referenced as inputs for a particular granularity of triggering mechanisms for performing the garbage collection operation, as will be further described.

In one embodiment, the area perspective considered by the garbage collection operation handles blocks of high and localized fragmentation. In this embodiment, the blocks considered for garbage collection processing should be in an area in which free space is above a certain threshold. Once a given area or region is selected, the garbage collection operation will be performed on the entire area or region, meaning that all blocks within the given area or region are processed.

In a similar embodiment, the block perspective considered by the garbage collection operation handles blocks of moderate and more distributed fragmentation. The block perspective covers all fragmented blocks individually, where each block in a given area has a priority which is determined by the block's free space. The garbage collection operation commences processing high priority blocks and ends with low priority blocks. Due to the aforementioned dependencies between blocks, the garbage collection process might create free space in neighboring blocks, and because of this, neighboring dependent blocks are also added to the garbage collection operation of their dependent blocks so as to mitigate these blocks from becoming too vacant.

Again, each perspective (block and area) is executed independently of one another and addresses a different type of inefficiency in the garbage collection process. As is detailed in the following sections, the block perspective addresses high levels of inefficiency in a narrow scope and the area perspective addresses a lower level of inefficiency but at a wider scope.

The advantages to such an operation are clear. First, the cost (of resources, etc.) in the storage system for performing the garbage collection operation in the presence of block dependencies is minimal. The garbage collection process of narrowly scoped free space is substantially lessened via the block perspective, and widespread low levels of free space are handled in bulk by the area perspective. Moreover, no special logic is required to handle block dependencies, as the area perspective handles these cases implicitly.

Figure 6:
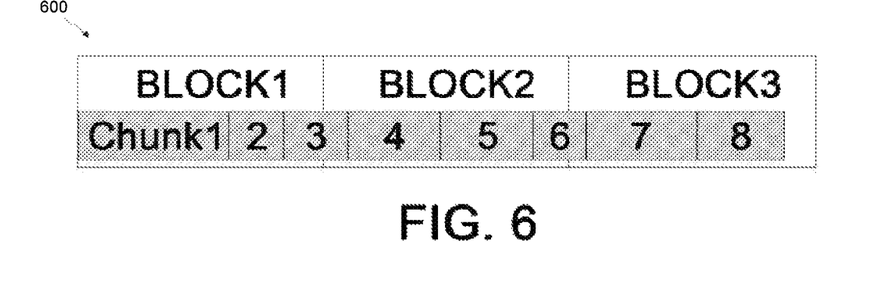
FIG. 6 illustrates a block diagram of data units used in association with the garbage collection operation, in accordance with aspects of the present invention.

For further brevity and clarity in understanding the functionality presented herein, the following definitions are referenced, in conjunction with diagram 600 of FIG. 6:

i) A Block comprises a constant size of physical unit of storage entity used by the garbage collection operation.

ii) A Chunk comprises a unit of data stored in the system. The chunk may be of any size, however is expected to be of somewhat smaller size than the size of a block. Accordingly, both the block and the chunk are referred to in their plain meaning as one skilled in the art would appreciate.

iii) Block dependencies, as shown in diagram 600, refer to a chunk which may be stored within the same area or region (e.g., chunks 3 and 6). Moving the chunks out of one block will create fragmentation in another block (e.g., moving chunk 3 out of block 1 will create a hole at the beginning of block 2).

The Block Perspective

In various embodiments, the garbage collection operation according to the block perspective examines individual blocks and determines if the block should be processed for garbage collection or not. The decision whether or not to perform the garbage collection operation on this block is based on the amount of unused space it contains. Thus, to avoid factoring in the free space that will be created in the neighboring blocks by performing the garbage collection operation on the first block, a high threshold of free space is used (e.g., 25% of the block is free space).

By utilizing this high threshold of free space, only heavily fragmented blocks will be processed for garbage collection. Past this threshold, it is clear that the garbage collection operation on the block will be justified, even when factoring in the neighboring blocks and block dependencies of the first block. If a neighboring block becomes heavily fragmented during the garbage collection of the first block, the neighboring block is processed for garbage collection as well. This logic is simplistic to implement and is therefore very CPU efficient. Accordingly, this perspective (the block perspective) cleans up and reclaims high levels of unused space in a narrow scope, namely, at the individual block level. Of note and in some embodiments, to trigger the initial garbage collection of the first block (and any subsequent neighboring or interdependent blocks thereafter), a minimal number of fragmented blocks may be used as a threshold to begin the garbage collection operation. That is, if the garbage collection has associated an initialization cost, it is possible to only trigger the initial garbage collection at the individual block level when it is determined that a number N blocks exist which require garbage collection processing.

The remaining issue is that there may be many blocks that are only moderately fragmented and do not reach the set high threshold. In this scenario with many such blocks being only moderately fragmented such that they do not surpass the high threshold of free space required to trigger the garbage collection operation at the block perspective, the high threshold may lead to an unacceptable accumulation of wasted space in the storage system. This scenario is therefore solved by performing the garbage collection operation according to the second perspective: the area perspective.

The Area Perspective

In various embodiments, the garbage collection operation according to the area perspective handles the aforementioned situations where many blocks are only moderately fragmented (have less free space than the high threshold to trigger the garbage collection operation of the block perspective). Heavily fragmented blocks (e.g., having >25% free space) are handled by the garbage collection operation according to the block perspective, and slightly fragmented blocks (e.g., having <5% free space) are considered not fragmented enough to justify the cost of initializing the garbage collection operation at the individual, block perspective level. Thus, moderately fragmented blocks are handled according to the area perspective garbage collection operation. In the area perspective, the inefficiency level of a large area containing many blocks is examined. Upon examining the area or region comprised of many blocks, a tolerated level of wasted space due to fragmentation threshold (e.g., the area has 7% free space due to fragmentation) is used to trigger the garbage collection operation for processing all blocks in the given area or region. Once the given area's threshold is passed, the garbage collection operation will be initialized for processing all blocks with wasted (free/fragmented) space, even those blocks that did not pass the block perspective's criteria. That is, even though a block may not be processed for garbage collection upon the garbage collection operation being initialized according to the block perspective (due to the block not meeting the block perspective threshold of free space), the block may be processed for garbage collection under the area perspective when the block is within a given area which surpasses the area threshold to trigger the commencement of the garbage collection operation thereof. In short, the garbage collection operation is performed on all blocks in the given area when the fragmentation threshold surpasses a predetermined percentage.

When performing the garbage collection operation on the given area or region, there may be cross effects between blocks, as multiple blocks are processed at a given time according to their area. A key advantage of this mechanism disclosed herein is that the inter-block dependencies discussed previously become irrelevant and are inherently handled by the garbage collection operation at the area level. Because this area perspective is performed only when there are many blocks in the area that require garbage collection, any neighboring block to a known block in the area requiring garbage collection has a good chance of requiring garbage collection processing in its own right, even prior to this block being affected by the performance of the garbage collection operation of its neighboring blocks. Since this perspective encompasses a large area, the cost of performing the garbage collection operation on the entire area is greater than that of the block perspective, and for this reason, blocks must first pass through garbage collection processing according to the block perspective at a first time and only then move in to the garbage collection processing according to the area perspective at a second time.

It should also be noted that the performance of the garbage collection operation according to the area perspective supports prioritization of garbage collection processing on certain areas. This prioritization may be based on metrics such as, free space within the area (e.g., a fragmentation level of the area), an age of the data within the area, etc.

Figure 7:
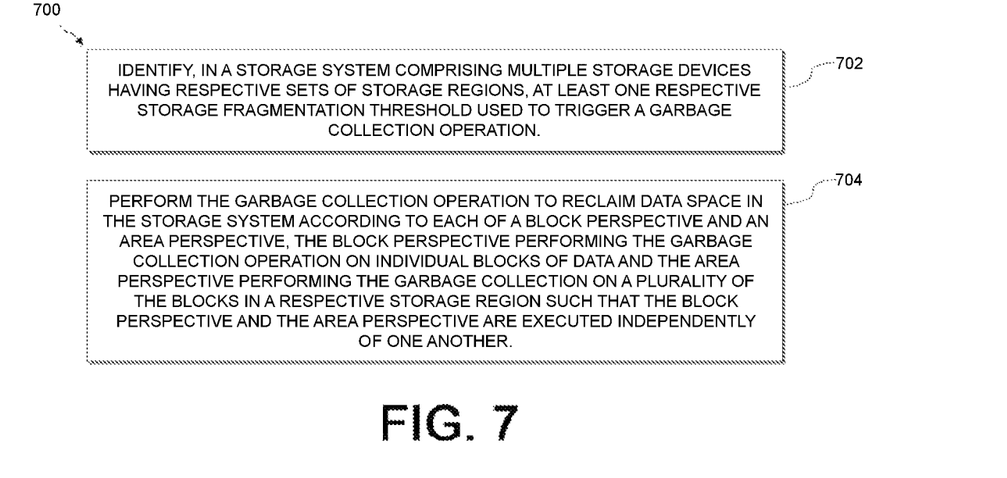
FIG. 7 illustrates a flowchart diagram illustrating an exemplary method for efficient garbage collection in a data storage environment, by which aspects of the present invention may be implemented.

FIG. 7 illustrates an additional exemplary method 700 for efficient garbage collection in a data storage environment, in accordance with one embodiment of the present invention. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

The method 700 begins at step 702 by identifying, in a storage system comprising multiple storage devices having respective sets of storage regions, at least one respective storage fragmentation threshold used to trigger a garbage collection operation. At step 704, the garbage collection operation is performed to reclaim data space in the storage system according to each of a block perspective and an area perspective, the block perspective performing the garbage collection operation on individual blocks of data and the area perspective performing the garbage collection operation on a plurality of the blocks in a respective storage region; wherein the block perspective and the area perspective portions of the garbage collection operation are executed independently of one another to more efficiently utilize computing resources consumed upon performing the garbage collection operation.

Figure 8A:
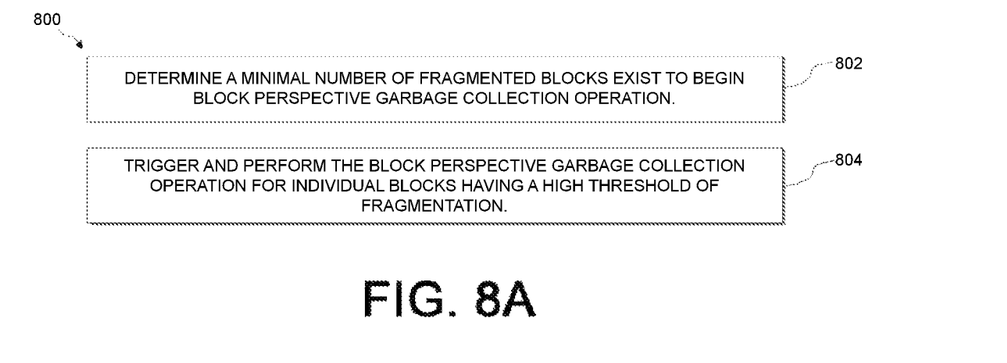
FIG. 8A illustrates a flowchart diagram illustrating an exemplary method for efficient garbage collection according to a block perspective in a data storage environment, by which aspects of the present invention may be implemented.
Figure 8B:
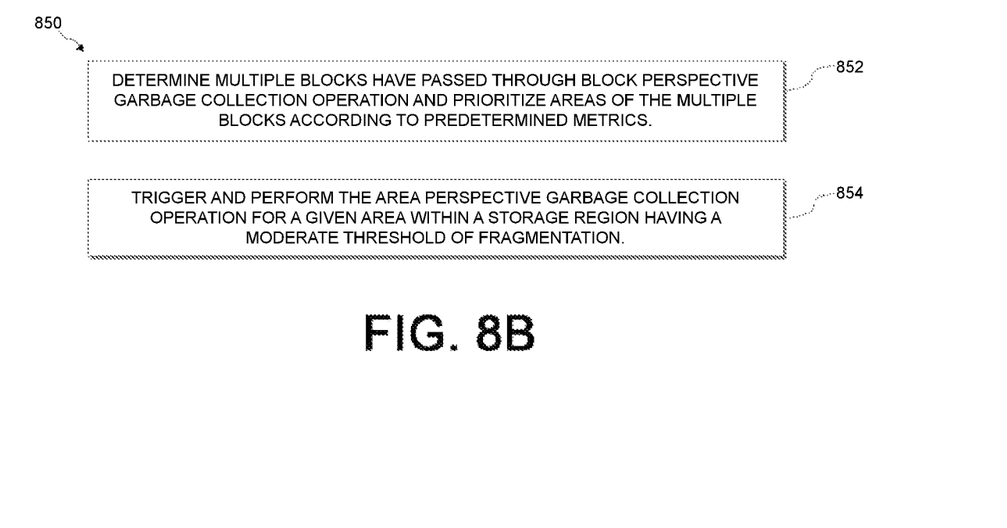
FIG. 8B illustrates a flowchart diagram illustrating an exemplary method for efficient garbage collection according to an area perspective in a data storage environment, by which aspects of the present invention may be implemented.

FIGS. 8A and 8B illustrate additional exemplary methods 800 and 850 for efficient garbage collection according to the block perspective in method 800 and the area perspective in method 850 in a data storage environment, in accordance with one embodiment of the present invention. The methods 800 and 850 may each be performed in accordance with the present invention in any of the environments depicted in FIGS. 1-4, among others, in various embodiments. Of course, more or less operations than those specifically described in FIGS. 8A and 8B may be included in methods 800 and 850, as would be understood by one of skill in the art upon reading the present descriptions.

Each of the steps of the methods 800 and 850 may be performed by any suitable component of the operating environment. For example, in various embodiments, the methods 800 and 850 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the methods 800 and 850. Illustrative processors include, but are not limited to, a central processing unit (CPU), an application specific integrated circuit (ASIC), a field programmable gate array (FPGA), etc., combinations thereof, or any other suitable computing device known in the art.

In an embodiment for performing the garbage collection operation according to the block perspective, the method 800 begins at step 802 by determining a minimal number of fragmented blocks exist to begin the garbage collection operation. At step 804, the garbage collection operation is triggered on individual blocks which have a high threshold of fragmentation. As discussed previously, this high threshold of fragmentation may comprise a predetermined percentage (e.g., 25%) of free space within each given block, indicating the block is heavily fragmented. In other embodiments, additional and/or alternative thresholds may be used as one skilled in the art would appreciate. Once triggered, the garbage collection operation is performed on the individual blocks surpassing the high threshold such that the blocks are defragmented and space consumed by the fragmentation is reclaimed to the storage system.

In an embodiment for performing the garbage collection operation according to the area perspective, the method 850 begins at step 852 when multiple blocks are determined to have passed through the garbage collection operation according to the block perspective, and respective areas or regions are ordered according to predetermined metrics. These predetermined metrics may comprise an age of given data within the area or region (or an average thereof), a fragmentation percentage of the area or region, or any other relevant metric known in the art. At step 854, the garbage collection operation is triggered and performed on all blocks within the given area or region having a moderate level of fragmentation. The detection of this moderate level of fragmentation determined by way of a predetermined fragmentation percentage threshold such that if free space in the region surpasses this predetermined threshold (when considering all blocks within the region), the garbage collection operation is performed on the given area or region surpassing such that all blocks within the given area are defragmented and space consumed by the fragmentation is reclaimed to the storage system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for efficient garbage collection in a data storage environment, by a processor, comprising:
    identifying, in a storage system comprising multiple storage devices having respective sets of storage regions, at least one respective storage fragmentation threshold used to trigger a garbage collection operation; and
    performing the garbage collection operation to reclaim data space in the storage system according to each of a block perspective and an area perspective, the block perspective performing the garbage collection operation on individual blocks of data and the area perspective performing the garbage collection operation on a plurality of the blocks in a respective storage region; wherein the at least one storage fragmentation threshold further comprises a first, high threshold of block free space measuring an amount of free space currently utilized in each of the plurality of blocks, the first threshold used to trigger the garage collection operation of the block perspective; and a second, fragmentation percentage threshold measuring a percentage level of tolerated wasted space due to fragmentation in the given region, the second threshold used to trigger the garbage collection operation of the area perspective; and wherein the block perspective and the area perspective portions of the garbage collection operation are executed independently of one another to more efficiently utilize computing resources consumed upon performing the garbage collection operation.

2. The method of claim 1, further including triggering the garbage collection operation of the block perspective on a given block of data when it is determined that the first, high threshold of block free space has been surpassed for the given block of data.

3. The method of claim 1, further including, prior to triggering the garbage collection operation of the block perspective, determining whether a minimal number of fragmented blocks exist that require the garbage collection operation.

4. The method of claim 1, further including triggering the garbage collection operation of the area perspective on the plurality of blocks within the respective storage region when it is determined that the second, fragmentation percentage threshold has been surpassed.

5. The method of claim 4, further including, prior to triggering the garbage collection operation of the area perspective, ordering given areas of the given storage region requiring the garbage collection operation according to predetermined metrics; wherein the metrics include at least a fragmentation level and an age of the data of the given area.

6. The method of claim 1, further including performing the garbage collection operation of the block perspective on the individual blocks at a first time prior to the performance of the garbage collection operation of the area perspective on the plurality of the blocks at a second time.

7. A system for efficient garbage collection in a data storage environment, the system comprising:
    a processor device executing instructions stored in a memory device, wherein the processor:
        identifies, in a storage system comprising multiple storage devices having respective sets of storage regions, at least one respective storage fragmentation threshold used to trigger a garbage collection operation; and
        performs the garbage collection operation to reclaim data space in the storage system according to each of a block perspective and an area perspective, the block perspective performing the garbage collection operation on individual blocks of data and the area perspective performing the garbage collection operation on a plurality of the blocks in a respective storage region; wherein the at least one storage fragmentation threshold further comprises a first, high threshold of block free space measuring an amount of free space currently utilized in each of the plurality of blocks, the first threshold used to trigger the garage collection operation of the block perspective; and a second, fragmentation percentage threshold measuring a percentage level of tolerated wasted space due to fragmentation in the given region, the second threshold used to trigger the garbage collection operation of the area perspective; and wherein the block perspective and the area perspective portions of the garbage collection operation are executed independently of one another to more efficiently utilize computing resources consumed upon performing the garbage collection operation.

8. The system of claim 7, wherein the processor triggers the garbage collection operation of the block perspective on a given block of data when it is determined that the first, high threshold of block free space has been surpassed for the given block of data.

9. The system of claim 7, wherein the processor, prior to triggering the garbage collection operation of the block perspective, determines whether a minimal number of fragmented blocks exist that require the garbage collection operation.

10. The system of claim 7, wherein the processor triggers the garbage collection operation of the area perspective on the plurality of blocks within the respective storage region when it is determined that the second, fragmentation percentage threshold has been surpassed.

11. The system of claim 10, wherein the processor, prior to triggering the garbage collection operation of the area perspective, orders given areas of the given storage region requiring the garbage collection operation according to predetermined metrics; wherein the metrics include at least a fragmentation level and an age of the data of the given area.

12. The system of claim 7, wherein the processor performs the garbage collection operation of the block perspective on the individual blocks at a first time prior to the performance of the garbage collection operation of the area perspective on the plurality of the blocks at a second time.

13. A computer program product for efficient garbage collection in a data storage environment, by a processor device, the computer program product embodied on a non-transitory computer-readable storage medium having computer-readable program code portions stored therein, the computer-readable program code portions comprising:

an executable portion that identifies, in a storage system comprising multiple storage devices having respective sets of storage regions, at least one respective storage fragmentation threshold used to trigger a garbage collection operation; and an executable portion that performs the garbage collection operation to reclaim data space in the storage system according to each of a block perspective and an area perspective, the block perspective performing the garbage collection operation on individual blocks of data and the area perspective performing the garbage collection operation on a plurality of the blocks in a respective storage region; wherein the at least one storage fragmentation threshold further comprises a first, high threshold of block free space measuring an amount of free space currently utilized in each of the plurality of blocks, the first threshold used to trigger the garage collection operation of the block perspective; and a second, fragmentation percentage threshold measuring a percentage level of tolerated wasted space due to fragmentation in the given region, the second threshold used to trigger the garbage collection operation of the area perspective; and wherein the block perspective and the area perspective portions of the garbage collection operation are executed independently of one another to more efficiently utilize computing resources consumed upon performing the garbage collection operation.

14. The computer program product of claim 13, further including an executable portion that triggers the garbage collection operation of the block perspective on a given block of data when it is determined that the first, high threshold of block free space has been surpassed for the given block of data.

15. The computer program product of claim 13, further including an executable portion that, prior to triggering the garbage collection operation of the block perspective, determines whether a minimal number of fragmented blocks exist that require the garbage collection operation.

16. The computer program product of claim 13, further including an executable portion that triggers the garbage collection operation of the area perspective on the plurality of blocks within the respective storage region when it is determined that the second, fragmentation percentage threshold has been surpassed.

17. The computer program product of claim 16, further including an executable portion that, prior to triggering the garbage collection operation of the area perspective, orders given areas of the given storage region requiring the garbage collection operation according to predetermined metrics; wherein the metrics include at least a fragmentation level and an age of the data of the given area.

18. The computer program product of claim 13, further including an executable portion that performs the garbage collection operation of the block perspective on the individual blocks at a first time prior to the performance of the garbage collection operation of the area perspective on the plurality of the blocks at a second time.

* * * * *